Aug. 10, 1937.    S. R. PUFFER    2,089,708
EXHAUST GAS DRIVEN TURBINE
Filed Aug. 31, 1934
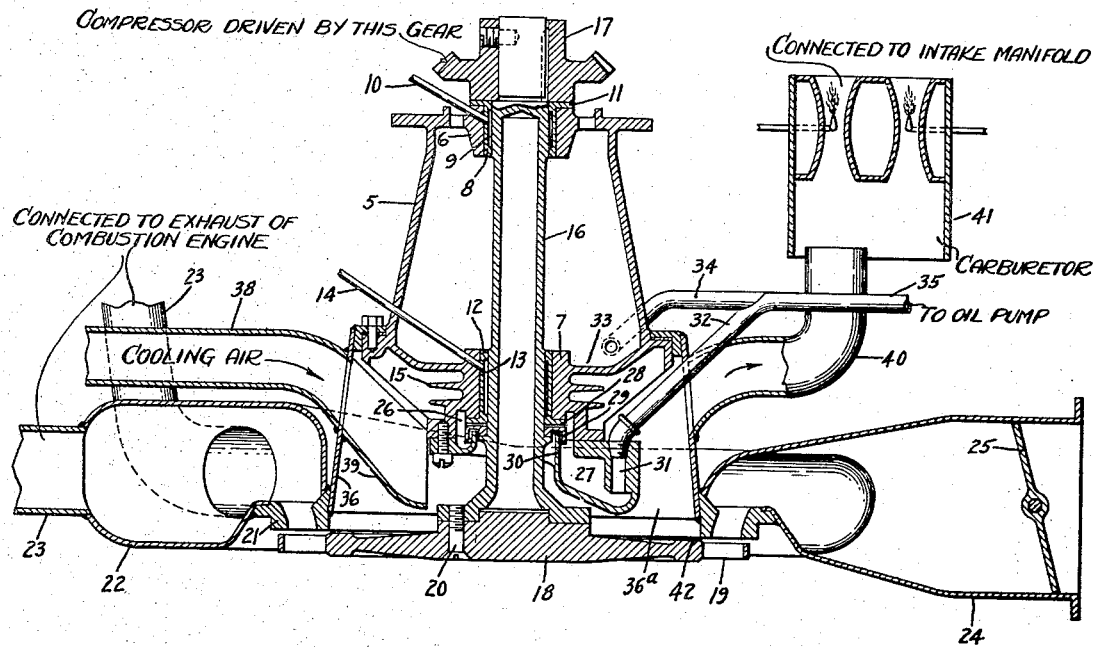
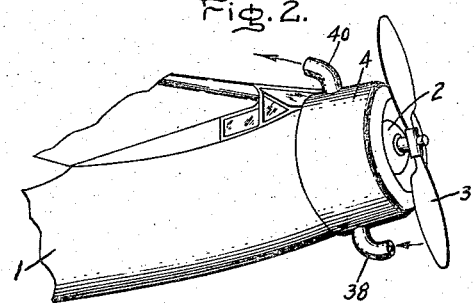
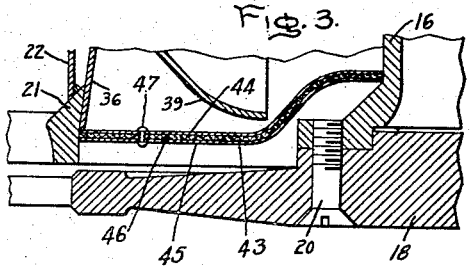
Inventor:
Samuel R. Puffer,
by Harry E. Dunham
His Attorney.

Patented Aug. 10, 1937

2,089,708

UNITED STATES PATENT OFFICE 2,089,708

EXHAUST GAS DRIVEN TURBINE

Samuel R. Puffer, Saugus, Mass., assignor to General Electric Company, a corporation of New York Application August 31, 1934, Serial No. 742,357

3 Claims. (Cl. 253—39)

The present invention relates to exhaust gas driven turbines. The invention is especially applicable to exhaust gas driven turbine superchargers for airplane engines and it is particularly illustrated and described in connection with such a supercharger. It is to be understood, however, that the invention is not limited thereto necessarily but may be utilized wherever found applicable.

Due to the high temperature of the exhaust gases from an internal combustion engine, it is necessary to provide cooling means for the gas turbine of a turbine driven supercharger and the object of the present invention is to provide an improved construction and arrangement for effecting cooling of the gas turbine and especially the bearing adjacent to the turbine wheel.

For a consideration of what I believe to be novel and my invention, attention is directed to the following description and the claims appended thereto.

In the drawing, Fig. 1 is a sectional view of a gas turbine embodying my invention; Fig. 2 is an outline of an airplane having an engine provided with a gas turbine driven supercharger and illustrating an arrangement for supplying air for cooling purposes, and Fig. 3 shows a modification.

Referring to the drawing, 1 indicates an airplane provided with an internal combustion engine 2 which drives a propeller 3 and which is enclosed in a housing or casing 4. The engine is provided with a supercharger comprising a turbine driven by exhaust gases from the engine, the turbine in turn driving a centrifugal compressor for supplying compressed air to the engine intake manifold. Usually, the air is supplied to the manifold in advance of the carburetor so that the air passes through the carburetor on its way to the manifold. The present invention has to do particularly with the turbine and its adjacent bearing and accordingly the centrifugal compressor is not specifically illustrated in the drawing.

Referring to Fig. 1, 5 indicates a fixed support or frame carried by a stationary part of the engine or airplane structure and provided with an upper bearing 6 and a lower bearing 7. The upper bearing has a lining 8 provided with an oil groove 9 to which is connected an oil supply pipe 10. Formed integral with the bearing lining 8 is a flange 11 which forms a step bearing. The lower bearing 7 is provided with a lining 12 having an oil groove 13 with which is connected an oil supply pipe 14. Also, bearing 7 is provided with cooling fins 15.

Mounted in bearings 6 and 7 is a shaft 16 on the upper end of which is fixed a beveled gear 17 which rests on bearing flange 11 and serves as a support for the shaft. Beveled gear wheel 17, through suitable connections, drives the impeller of centrifugal compressor (not shown). Shaft 16 is preferably made hollow in order to reduce its weight.

Fixed to the lower end of shaft 16 is a turbine wheel 18 provided with a row of buckets 19. The turbine wheel is fixed to a flange on the lower end of shaft 16 by studs 20 and is spaced away from the lower side of bearing 7. The turbine wheel is directly in the open, it being not provided with a casing of any kind.

Above the ring of buckets 19 is located a nozzle ring 21 having nozzles through which gas is directed to the buckets of the turbine wheel. The nozzle ring is carried by an annular nozzle box 22 to which are connected pipes 23 which convey exhaust gases from the engine cylinders to the nozzle box. The nozzle box is provided also with a discharge conduit 24 in which is located a waste valve 25. The waste valve is utilized to control the supply of exhaust gases to the turbine wheel. When the valve is open, exhaust gases discharge for the most part directly to the atmosphere. As the valve is closed, more and more of the gases are directed through the nozzles to the turbine wheel, all the gases being so directed when the valve is entirely closed. This is a known arrangement for controlling the supply of exhaust gases to a gas driven supercharger.

Surrounding the lower end of bearing 7 are walls which form an annular oil chamber 26 which at the right hand side of the drawing is enlarged to provide a sump 27. Oil discharged through the lower end of bearing 7 finds its way to oil chamber 26 and sump 27 through an annular space 28 which is defined by the lower flanged end of bearing lining 12 and an oil deflector ring 29 carried by shaft 16 and provided with a lip which depends into chamber 26 adjacent to the upper edge of the annular wall 30 of the oil chamber. Deflector ring 29 serves to divert oil leaking from the lower end of bearing 7, into oil chamber 26. Communicating with the lower end of sump 27 is a passage 31 to which is connected a discharge pipe 32. Oil discharged from the lower end of upper bearing 6 finds its way to a sump 33 at the lower end of casing 5 to which is connected a discharge pipe 34. Pipes 32 and 34 are connected by a pipe 35 to a suitable pump (not shown) for pumping oil from sumps 27 and 33 and returning it to the main oil supply tank.

Surrounding bearing 7 in spaced relation thereto is an annular wall 36 connected at its upper and lower ends to casing 5 and nozzle ring 21 respectively, and forming a support for the nozzle ring. Wall 36 defines an air cooling chamber 36a which surrounds the lower bearing 7. Chamber 36a is closed at its lower end by turbine wheel 18. Or otherwise considered, the upper surface of turbine wheel 18 is exposed directly to the air cooling chamber. Nozzle box 22 surrounds the air cooling chamber. Air is supplied to the air cooling chamber by a conduit 38 which projects out through housing 4 and points forwardly into the slip stream. It serves to take air from the atmosphere and discharge it to the air cooling chamber. Inside the air cooling chamber is a wall 39 which serves to direct the air to the bearing and also toward the top surface of the turbine wheel. On the side of the air cooling chamber opposite conduit 38 is a discharge conduit 40 through which air is discharged from the cooling chamber. The air from conduit 40 may be discharged directly to the atmosphere or it may be utilized as a partial or complete air supply for the engine intake manifold. It may be utilized with advantage as an air supply for the engine in cold weather as it is heated due to its passage over the bearing and turbine wheel.

In Fig. 1 of the drawing, conduit 40 is shown as discharging to the carburetor which in turn supplies mixture to the intake manifold. The carburetor is indicated diagrammatically at 41. In Fig. 2, conduit 40 is shown as discharging to the atmosphere, it being bent so that its discharge end faces rearwardly to obtain the benefit of the suction effect of the air flowing past it when the airplane is moving.

With the above described arrangement, when the airplane is moving, air flows through conduit 38 to the cooling chamber defined by wall 36. The air is directed over the lower bearing 7, the lower end of shaft 16, the oil chamber 26, and the sump 27 effecting cooling of these parts. Also, it is directed across the surface of the turbine wheel. The bearing 7 is spaced somewhat from the turbine wheel so as to provide an air space between it and the turbine wheel. Also, the turbine wheel when in operation acts as a pump and effects a flow of air along its upper surface, the air being discharged into the annular space 42 between the rim of the wheel and the outer face of the nozzle ring. This serves to convey heat away from the upper surface of the turbine wheel and to provide continuously a moving layer of air between the upper surface of the turbine wheel and the lower bearing. By this arrangement, I am enabled to keep the bearing cool enough so that it may be properly lubricated and, at the same time, I cool the turbine wheel.

In some instances, it may be found to be not desirable or necessary to cool the turbine wheel in conjunction with the cooling of the bearing. In such instances, I preferably provide a heat resisting shield between the bearing and the turbine wheel for protecting the bearing from radiant heat from the turbine wheel. This effects a better cooling of the bearing. Such an arrangement is shown in Fig. 3 wherein 43 indicates a shield located directly above the turbine wheel 18 and extending from the inner side of the nozzle ring 21 to the lower end of shaft 16, the shield being in the form of a disc having a central opening through which shaft 16 projects. The shield may be formed to advantage from upper and lower metal plates or discs 44 and 45 having a layer of suitable heat insulating material 46 between them, the plates being fastened together by rivets 47. Otherwise the arrangement shown in Fig. 3 may be the same as that shown in Figs. 1 and 2.

With this arrangement, the shield serves to direct the air from wall 39 toward the shaft and bearing and protects the bearing from radiant heat from the turbine wheel.

What I claim as new and desire to secure by Letters Patent of the United States, is:

1. In combination, a gas driven turbine comprising a bearing, a shaft in the bearing, said shaft having an overhung portion, a turbine wheel carried by the overhung shaft portion, a wall completely surrounding the bearing to define a cooling chamber for the bearing and the turbine wheel, an end of the cooling chamber being formed by one side of the turbine wheel, the other side of the turbine wheel being entirely exposed to the atmosphere, a nozzle box outside said wall for directing gases to the turbine wheel, and means for effecting flow of cooling air through said chamber, and means for conveying air from the cooling chamber to an engine.

2. In a gas turbine drive for airplane superchargers, the combination of a vertical shaft having a lower end with a flange, a gas turbine including a bucket wheel having a central portion secured to the flange, a support, a bearing for an intermediate portion of the shaft secured to the support, means for lubricating the bearing, the shaft being hollow and said bearing being spaced from the wheel to reduce the transfer of heat from the wheel to the bearing and thereby to assure proper lubrication of the bearing, means for cooling a portion of the bearing adjacent the wheel comprising a chamber having a wall completely surrounding the bearing and the lower shaft portion and a lower wall defined by a central portion of the turbine wheel and an upper wall defined by said support, and means for forcing cooling air through said chamber.

3. In a gas turbine drive for airplane superchargers, the combination of a vertical shaft having a lower end with a flange, a gas turbine including a bucket wheel having a central portion secured to the flange, a support, a bearing for an intermediate portion of the shaft secured to the support, means for lubricating the bearing, said bearing being considerably spaced from the wheel to reduce the transfer of heat from the wheel to the bearing and thereby to assure proper lubrication of the bearing, and means for cooling at least the portion of the bearing adjacent the wheel comprising a chamber having walls formed partly by the bearing and one side of the turbine wheel, said chamber having inlet and outlet openings to permit flow of cooling medium therethrough.

SAMUEL R. PUFFER.